T. J. LINDSAY.
WHEEL HUB AND SPINDLE FOR AUTOMOBILES.
APPLICATION FILED MAY 27, 1912.
1,107,330.
Patented Aug. 18, 1914.
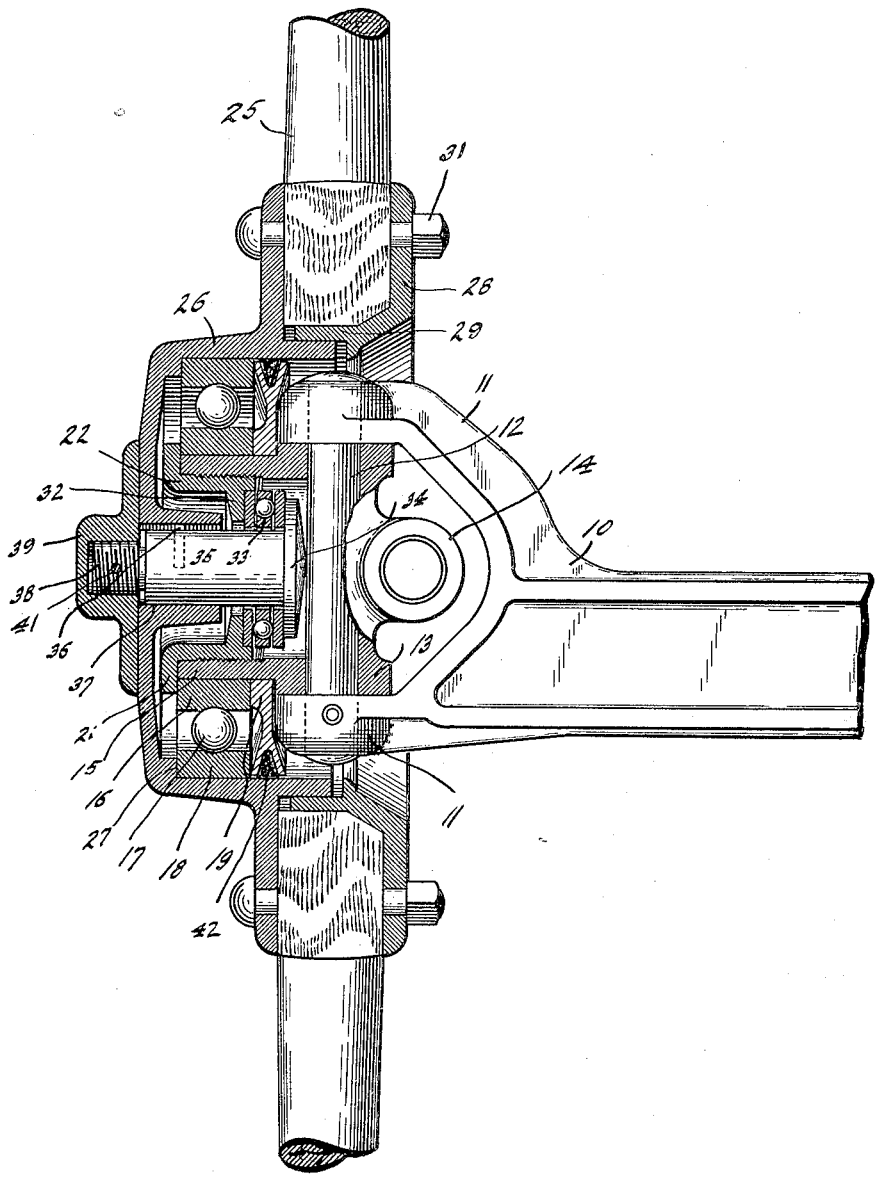
Witnesses
Frank A. Fahle
Geo. B. Schley
Inventor
Thomas J. Lindsay,
by Arthur M. Hood
Attorney

UNITED STATES PATENT OFFICE.

THOMAS J. LINDSAY, OF INDIANAPOLIS, INDIANA, ASSIGNOR TO LINDSAY AUTO PARTS COMPANY, A CORPORATION OF INDIANA.

WHEEL HUB AND SPINDLE FOR AUTOMOBILES.

1,107,330.  Specification of Letters Patent.  Patented Aug. 18, 1914.

Application filed May 27, 1912.  Serial No. 700,031.

*To all whom it may concern:*

Be it known that I, THOMAS J. LINDSAY, a citizen of the United States, residing at Indianapolis, in the county of Marion and State of Indiana, have invented a new and useful Wheel Hub and Spindle for Automobiles, of which the following is a specification.

The object of my invention is to produce a steering axle and wheel structure for automobiles, which shall be very compact and in which the substantially vertical axis of the steering wheel shall be in the wheel plane.

The accompanying drawing, which is an elevation in partial vertical section, illustrates my invention.

In the drawings, 10 indicates the axle proper which is provided at each end with a pair of vertically spaced fingers 11, 11 between which extends the substantially vertical pivot 12 of the steering knuckle 13. The steering knuckle 13 is provided with an operating arm 14 by means of which it may be swung upon its pivot, and at its outer end is provided with a sleeve 15 which externally forms the support for the inner race 16 of an annular load-supporting bearing 17 having an outer race 18. The inner race 16 is held against movement in one direction axially on sleeve 15 by means of the flange or ring 19 and is held against movement in the opposite direction by the flange 21 of a nut 22 which is threaded into the interior of sleeve 15. The steering wheel 25 is provided with a main hub member 26 which has an interior of sufficient diameter to receive the outer race 18 of bearing 17, said race abutting against a shoulder 27 at the closed outer end of the hub 26. Mating with the hub member 26 is a spoke clamping ring 28 which is provided with an annular flange 29 which sleeves over the open end of the hub member 26 and is fastened thereto by suitable clamping bolts 31, the internal diameter of the hub member 26 and the ring 28 being such that these parts will sleeve over or inclose the outer ends of the fingers 11 of the axle 10.

At its inner end nut 22 is provided with a shoulder or inwardly projecting flange 32 formed for the reception of a thrust bearing 33 which is interposed between the shoulder 32 and the head 34 of a pin 35 which is splined at 36 within the axial bore 37 of hub 26 and at its outer end is threaded at 38 to receive a clamping and adjusting nut 39 which may be held against rotation by means of pin 41 passing through the nut and the threaded end 38 or may be held against rotation by any other desirable and suitable means.

The ring 19 is provided with a circumferential seat arranged for the reception of a packing 42 which serves to engage the interior of hub 26, thus protecting the bearing 17, as well as the thrust bearing 33, from dirt. By this arrangement, I am enabled to place the vertical axis of the steering wheel within the wheel plane and by this means am able to swing the steering wheel with a minimum force. The construction is also such that ordinary ball bearings may be used (though the invention is by no means limited to such particular form of bearing).

In assembling this structure, the bearing 16—17—18 will be slipped upon sleeve 15; bearing 33 placed in position against shoulder 32 and pin 35 slipped through said bearing and the nut 22, and the nut then screwed into place in sleeve 15. Thereupon the wheel hub 26 will be slipped over the race 18 and the bore 37 will be slipped over the outer end of pin 35, whereupon nut 39 may be screwed upon the threaded end 38 so as to carry the several parts snugly to position. By this arrangement, the single bearing 16—17—18 carries the major portion of the load as a radially applied load, while the thrust bearing 33 retains the wheel in a plane at right angles to the axis of the wheel by an axially applied thrust.

I claim as my invention:

1. The combination of an axle, a substantially vertical knuckle pivot, a knuckle pivoted on said pivot and having a tubular outer end, a single bearing arranged upon said tubular outer end to receive a radially applied load, a wheel having a hollow hub sleeved over and wholly supported radially by said single bearing, said wheel hub embracing the knuckle pivot so that said pivot is within the wheel plane, an axial-thrust bearing interposed between the knuckle and the wheel hub, said two bearings sustaining the wheel and its support in operative relation, and the axial-thrust bearing being within said tubular outer end and smaller in external diameter than said tubular outer end is in internal diameter so that it can be withdrawn therethrough, and means for normally preventing said axial-thrust bearing from being so withdrawn.

2. The combination of an axle, a substantially vertical knuckle pivot, a knuckle pivoted on said pivot and having a tubular outer end, a single bearing arranged upon said tubular outer end to receive a radially applied load, a wheel having a hollow hub sleeved over and wholly supported radially by said single bearing, an axial-thrust bearing interposed between the knuckle and the wheel hub, said two bearings sustaining the wheel and its support in operative relation, and the axial-thrust bearing being within said tubular outer end and smaller in external diameter than said tubular outer end is in internal diameter so that it can be withdrawn therethrough, and means for normally preventing said axial-thrust bearing from being so withdrawn.

3. The combination of an axle, a substantially vertical knuckle pivot, a knuckle pivoted on said pivot and having a tubular outer end, a bearing arranged upon said tubular outer end to receive a radially applied load, a wheel having a hollow hub sleeved over and supported by said bearing, said wheel hub embracing the knuckle pivot so that said pivot is within the wheel plane, a nut threaded into the interior of the tubular outer end of the knuckle, a pin carried by the wheel hub and axially adjustable therein, an axial-thrust bearing interposed between said nut and pin, and means for clamping the pin and wheel hub together, said means comprising a nut threaded upon the said pin and engaging the wheel hub.

4. The combination of an axle, a substantially vertical knuckle pivot, a knuckle pivoted on said pivot and having a tubular outer end, a bearing arranged upon said tubular outer end to receive a radially applied load, a wheel having a hollow hub sleeved over and supported by said bearing, said wheel hub embracing the knuckle pivot so that said pivot is within the wheel plane, a nut threaded into the interior of the tubular outer end of the knuckle, a pin carried by the wheel hub, and an axial-thrust bearing interposed between said nut and pin.

5. The combination of an axle, a substantially vertical knuckle pivot, a knuckle pivoted on said pivot and having a tubular outer end, a bearing arranged upon said tubular end to receive a radially applied load, a wheel having a hollow hub sleeved over and supported by said bearing, said wheel hub embracing the knuckle pivot so that said pivot is within the wheel plane, a nut threaded into the interior of the tubular outer end of the knuckle, a pin carried by the wheel hub and axially adjustable therein, an axial-thrust bearing interposed between said nut and pin, and means for clamping the pin and wheel hub together.

6. The combination of an axle, a knuckle pivot, a knuckle pivoted on said pivot and having a tubular outer end, a single bearing arranged upon the outer end of said knuckle to receive a radially applied load, a wheel having a hollow hub sleeved over and wholly supported radially by said single bearing, said wheel hub embracing the knuckle pivot so that said pivot is within the wheel plane, an axial-thrust bearing interposed between said knuckle and said wheel hub, said axial-thrust bearing being within said tubular outer end of the knuckle and being withdrawable therethrough, and means for normally preventing such withdrawal.

7. The combination of an axle, a substantially vertical knuckle pivot, a knuckle pivoted on said pivot and having a tubular outer end, a bearing arranged upon said tubular outer end to receive a radially applied load, a wheel having a hollow hub sleeved over and supported by said bearing, a nut threaded into the interior of the tubular outer end of the knuckle, a pin carried by the wheel hub and axially adjustable therein, an axial-thrust bearing interposed between said nut and pin, and means for clamping the pin and wheel hub together, said means comprising a nut threaded upon the said pin and engaging the wheel hub.

8. The combination of an axle, a substantially vertical knuckle pivot, a knuckle pivoted on said pivot and having a tubular outer end, a bearing arranged upon said tubular outer end to receive a radially applied load, a wheel having a hollow hub sleeved over and supported by said bearing, a nut threaded into the interior of the tubular outer end of the knuckle, a pin carried by the wheel hub, and an axial-thrust bearing superposed between said nut and pin.

9. The combination of an axle, a substantially vertical knuckle pivot, a knuckle pivoted on said pivot and having a tubular outer end, a bearing arranged upon said tubular outer end to receive a radially applied load, a wheel having a hollow hub sleeved over and supported by said bearing, a nut threaded into the interior of the tubular outer end of the knuckle, a pin carried by the wheel hub and axially adjustable therein, an axial-thrust bearing interposed between said nut and pin, and means for clamping the pin and wheel hub together.

10. The combination of an axle, a substantially vertical knuckle pivot and having a hollow outer end, a knuckle pivoted on said pivot, a single bearing arranged upon the outer end of said knuckle to receive a radially applied load, a wheel having a hollow hub sleeved over and wholly supported radially by said single bearing, an axial-thrust bearing interposed between said knuckle and wheel hub and located within and withdrawably outwardly from said hollow outer end, and releasable means for normally preventing such withdrawal.

11. The combination of an axle, a substantially vertical knuckle pivot, a knuckle pivoted on said pivot and having a tubular outer end, a wheel having a hollow hub sleeved over said tubular outer end, a bearing arranged upon said tubular outer end and within the wheel hub to support the whole radially applied load, an axial thrust bearing interposed between the knuckle and the wheel hub, said two bearings sustaining the wheel and its support in operative relation, and the axial-thrust bearing being within said tubular outer end and withdrawable outwardly therefrom, and means removably mounted in said tubular outer end for transmitting the thrust from said axial-thrust bearing to said knuckle and for normally preventing such withdrawal.

12. The combination of an axle, a knuckle pivot, a knuckle pivoted on said pivot and having a tubular outer end, a single bearing arranged upon said tubular outer end to receive a radially applied load, a wheel having a hollow hub sleeved over and wholly supported by said single bearing, and an axial-thrust bearing interposed between the knuckle and the wheel hub and connected to the wheel hub by a member extending through said tubular outer end of said knuckle, said axial-thrust bearing and said member extending through said tubular outer end being withdrawable outwardly through said tubular outer end.

13. The combination of an axle, a knuckle pivot, a knuckle pivoted on said pivot, a single bearing arranged upon the outer end of said knuckle to receive a radially applied load, said bearing and said knuckle pivot being in different planes, a wheel having a hollow hub sleeved over and wholly supported radially by said single bearing, said wheel being substantially in the plane of the knuckle pivot, and an axial-thrust bearing interposed between said knuckle and said wheel hub.

14. The combination of an axle, a knuckle pivot, a knuckle pivoted on said pivot and having a hollow outer end, a single bearing arranged upon the outer end of said knuckle to receive a radially applied load, a wheel having a hollow hub sleeved over and wholly supported radially by said single bearing, and an axial-thrust bearing interposed between said knuckle and said wheel hub and located within the hollow outer end of said knuckle, said axial-thrust bearing being withdrawable outwardly from the hollow end of said knuckle.

In witness whereof, I, have hereunto set my hand and seal at Indianapolis, Indiana, this 25th day of May, A. D. one thousand nine hundred and twelve.

THOMAS J. LINDSAY. [L. S.]

Witnesses:
G. B. SCHLEY,
FRANK A. FAHLE.

---

Copies of this patent may be obtained for five cents each, by addressing the "Commissioner of Patents, Washington, D. C."